Jan. 19, 1932. A. S. THOMPSON 1,841,991
VEHICLE BODY
Filed March 13, 1930 2 Sheets-Sheet 1
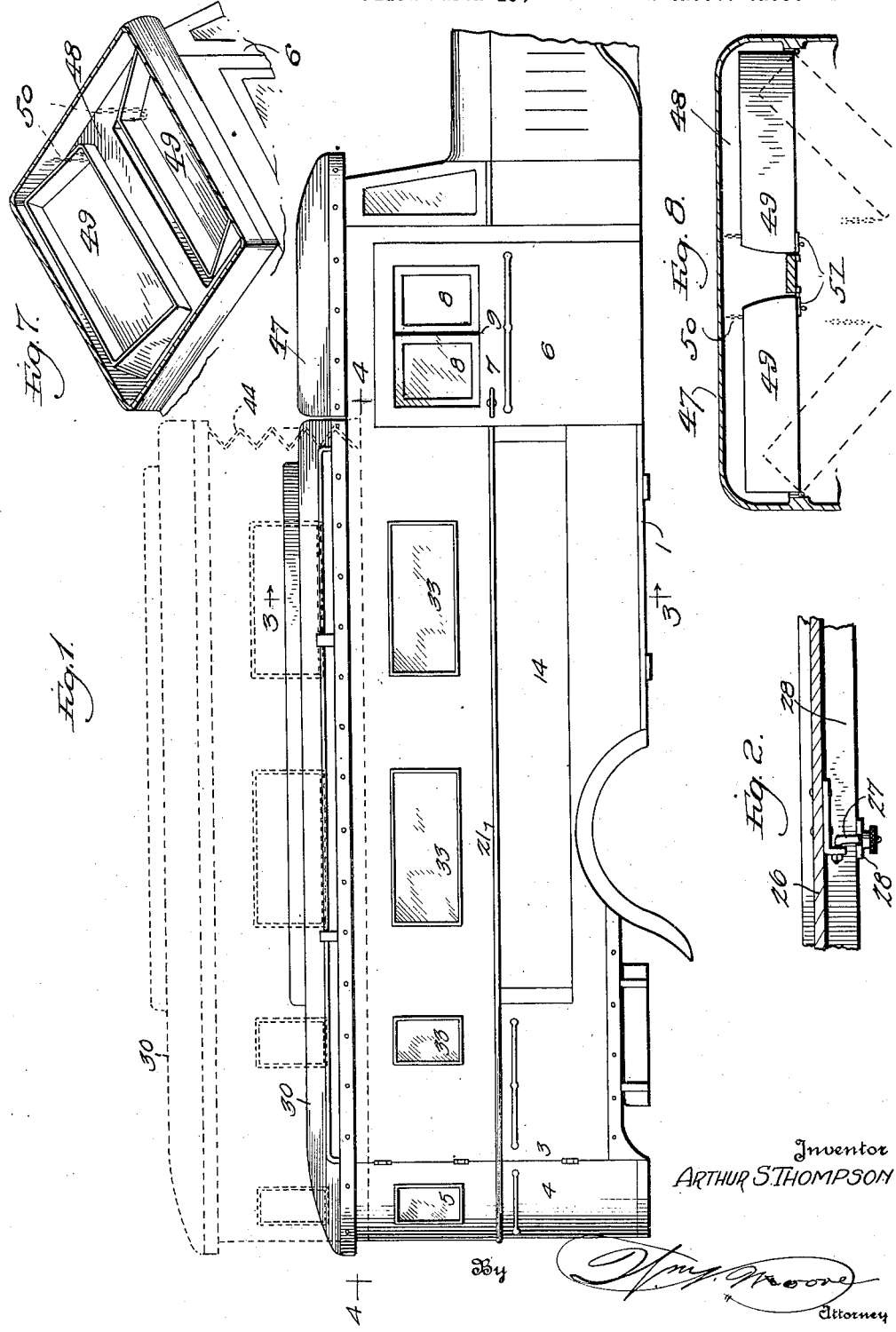
Inventor
ARTHUR S. THOMPSON
By
Attorney Jan. 19, 1932.   A. S. THOMPSON   1,841,991
VEHICLE BODY
Filed March 13, 1930   2 Sheets-Sheet 2
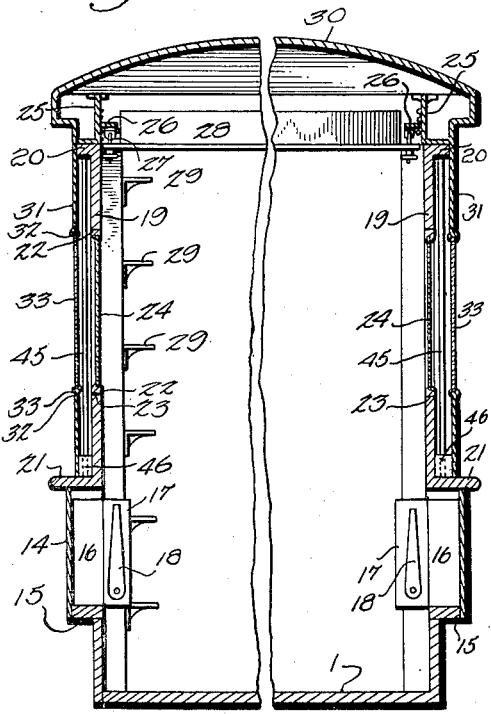

Patented Jan. 19, 1932

1,841,991

UNITED STATES PATENT OFFICE

ARTHUR S. THOMPSON, OF ONTARIO, CALIFORNIA

VEHICLE BODY

Application filed March 13, 1930. Serial No. 435,534.

My invention relates to improvements in vehicle bodies, and one object of my invention is the provision of a body structure which can be readily mounted upon the chassis of an automobile or motor vehicle and which will effectively serve as a bus, ambulance, camping or touring vehicle as circumstances require.

Another object of my invention is the provision of a vehicle body which will have a large seating capacity and which can be instantly converted into a sleeping car and which will prove entirely satisfactory for both uses.

Another object of my invention is the provision of a vehicle body which will provide either seating or sleeping accommodations, will be of small size when capacity is considered and which will be of very ornamental and attractive appearance.

Another object of my invention is the provision of a vehicle body of the character and for the uses described, which will be very strong and durable, easy riding and very comfortable and which can be built at a price which will make its use very desirable and practical.

With the objects stated in view, my invention consists of a vehicle body embodying novel features of construction and arrangement of its parts, substantially as described and defined by the claims and as shown in the accompanying drawings, in which:

Figure 1 represents a side view of a vehicle body constructed in accordance with and embodying my invention, the position of the top or roof structure being shown in raised position in dotted lines.

Figure 2 represents a detail view of the fastening means for securing the bed structure in its relation to the body and top or roof of the body.

Figure 3 represents a sectional view on line 3—3 of Figure 1.

Figure 4 represents a sectional view on line 4—4 of Figure 1.

Figure 5 represents a detail view in end elevation of the means for raising and lowering the top or roof of my body, with parts of the roof and sides of the body shown in section, and Figure 6 represents a perspective view of one of the doors at the front or driver's compartment of the body.

Figures 7 and 8 represent detail views of the storage boxes and cases which are mounted in the chamber of the roof which covers the driver's forward compartment.

Referring by numeral to the drawings in which the same numbers of reference are used to denote the same parts in all the views:

The numeral 1 designates the bottom or floor of the body, which is formed with the rear platform or extension 2, which is of curved form and provided with the curved walls 3, and the hinged curved doors 4, whose upper portions are provided with windows 5, and this construction forms an observation platform which may be open to the air, or closed when the weather is unpleasant.

Upon the forward portion of the floor is mounted the driver's compartment 6, which is provided on each side with hinged doors 7, which are of the novel construction shown in Figure 6, and which is provided with the upper pair of windows 8, hinged at 9, to be easily opened or closed, the compartment 10, below said windows, which has the hinged door 11, and below which is the curved box or case 12, having hinged cover or lid 13, the said compartment 10 forming a case for suits or dresses and the box or case 12, being useful as a container for clothing or other articles, and this door structure is an important feature of my invention.

The body is formed with the lower side panels 14, which are offset as shown at 15, to form chambers or spaces 16, for the double section folding bed structure 17, which in Figure 3 is shown as closed, and such structure is provided with legs 18, for supporting the beds in lowered position when in use.

The body has fitted in said lower panels the upper side panels 19, which panels are provided with the upper rail 20, and the lower and broader sill 21, and the said panels are further provided with the series of frames 22, mounted in openings 23, and thus said frames may be applied or removed when desired and such frames have mounted therein windows 24, although wire screens may be used in place of glass windows when found necessary or desirable.

The upper rails 20, form the support for the pair of L shaped metal rails 25, which are formed with a flange or rib 26, to which flanges are connected the fastenings 27, shown in Figure 2, which are carried by the upper bed structure 28, which is thus disposed near the upper part of the body and out of the way, and to which access is obtained by the steps 29, all as most clearly shown in Figure 3.

This top bed structure may extend the length of the body and will provide sleeping accommodations for a number of persons according to the length of the body, and while this bed structure is stationary the top or roof 30, is movable and is provided with the depending sides or wings 31, which are provided with openings 32, receiving window or screen frames 33, which when the roof is lowered to normal position as shown in Figure 3, brings said windows of the side panels of the body and the wings carried by the roof in line with the lower edges of said wings resting on the sills 21 of the sides of the body, and to raise and lower said roof I provide a novel mechanism which is shown most clearly in Figures 4 and 5.

The said raising and lowering means consists of the pair of longitudinal shafts 34, mounted in bearings 35, in the upper portion of the body, each shaft carrying a pair of gear wheels 36, which mesh with the depending rack bars 37, hanging from the roof, and the rear ends of said shafts 34 are extended as shown at 38, and carry gear wheels 39, over which travels the chain 40, and which chain is caused to travel by means of the sprocket or gear wheels 41 and 41', the shaft of said sprocket wheel 41', having a crank 42, for manually revolving its shaft and causing the chains 43, which engages the sprocket or gear wheels 41 and 41' and said chain 40, to move and to raise and lower the roof of the body, as will be readily understood.

The construction, operation and advantages of my vehicle body will be readily understood from the drawings taken in connection with the description and further elaboration is not deemed necessary, and it will be noted that in use as a touring or travelling vehicle the floor is occupied by suitable chairs or seats, which are not shown, and that the roof is lowered as shown in Figures 3 and 5, and when necessary to convert the body into sleeping accommodations, the roof is raised to the position shown in dotted lines in Figure 1, by means of the mechanism shown in Figure 5, and this forms a large space or compartment above the bed structure, which roof may be entirely closed by the windows and curtain 44, or the windows may be opened for purpose of ventilation and this provides a large, commodious and comfortable sleeping compartment above the ground where clean and pure air may circulate and protection from insects be assured, and if further beds are required the bed structures at the sides of the body may be adjusted for use.

It will be evident that a vehicle body constructed according to my invention will be of large capacity which is of attractive and ornamental appearance; also that the body may be used for touring by providing travelling and sleeping accommodations of a most comfortable nature; and that the body may be produced at a figure to render its use highly desirable and practical.

It will be noted that the side members or wings of the roof are arranged parallel with the sides of the body and to maintain this relation, I provide the series of vertical guide rods 45, which are secured to the side panels of the body and the wings are also provided with slotted guides 46, at their lower edges which move snugly on said rods and thus provide guiding and retaining means, and this is an important feature of my invention.

A most important feature of my invention is the storing features of my vehicle and as shown in Figures 7 and 8 the roof 47 of the driver's compartment forms a chamber 48, and disposed in this chamber are the pair of hinged cases 49, which are limited in their open or downward position by chains 50, and are retained in closed position by the catches 51, and this arrangement insures a large storing capacity which is entirely out of the way when closed and which can be quickly opened for filling or removal of articles.

It will be noted by reference to Figure 3 of the drawings, that the lower portion of my vehicle body above the floor and side panels mounted thereon, is of increased width and that the upper portion is of decreased width or narrower than said increased width portion of the lower portion and this construction is of paramount importance as it provides longitudinal chambers or compartments in the lower portion to receive folding bed structures and also forms space on each side of said upper portion in which the wings which support the roof structure normally fit and are capable of vertical movement and this construction gives a streamline formation to the body as a whole, greatly enhancing the beauty and desirability of the body and the roof and wings are limited in their lowered position within said spaces and may be elevated to provide a compartment above the bed structure supported in the upper portion.

Also, it will be noted that the bed structure is mounted in the top of the upper portion of the body and that said upper portion and wings are each provided with windows, the windows of the wings when lowered alining with the windows of the upper portion and when raised being disposed above the bed structure to provide an upper compartment with light and air.

Also, it will be noted that the bed structure practically covers the open upper portion of the body and that the wings can be easily raised to form a compartment above the bed structure and lowered to aline with the windows in the lower portion providing a double window construction and that the raising and lowering means serve to guide the wings and retain them in proper parallel relation at all times to preserve the stream line feature of my invention.

I claim:

1. A vehicle body of the character described, comprising a lower part having a contiguous portion of increased width, an upper portion of decreased width mounted on said lower portion to form a space on each side of said upper portion, a roof structure, wings depending from said roof structure and fitting and guided in the space on each side of said upper portion, windows in said upper portion and wings, and means for lowering said wings to bring the windows of the wings and upper portion into alinement and to raise said wings to dispose its windows above the upper portion and to provide a compartment above said upper portion.

2. A vehicle body of the character described, comprising a lower portion having a contiguous portion of increased width, an upper portion of decreased width mounted on said lower portion to form a space on each side of said upper portion, a roof structure, wings depending from said roof structure and fitting and guided in the space on each side of said upper portion, windows in said upper portion and wings, a bed structure mounted in the upper portion of said upper portion of the body, and means for lowering said wings to bring the windows of the wings and upper portion into alinement to form a double window construction and to raise said wings to dispose its windows above the upper portion and bed structure and to provide a compartment above said upper portion.

3. A vehicle body of the character described, comprising a lower part having a contiguous portion of increased width to form a pair of similar longitudinal chambers, an upper portion of decreased width mounted on said lower portion to form a space on each side of said upper portion, a roof structure, wings depending from said roof structure and fitting and guided in the space on each side of said upper portion, windows in said upper portion and wings, a bed structure mounted in the upper portion of said upper portion of the body, and means for lowering said wings to bring the windows of the wings and upper portion into alinement and to form a double window construction and to raise said wings to dispose its windows above the upper portion and bed structure and to provide a compartment above said upper portion and means for guiding said wing portion in its movement and retaining it in parallel relation with said lower portion.

4. A vehicle body of the character described, comprising a lower part having a contiguous portion of increased width providing in said lower portion a pair of similar longitudinal chambers, an upper portion of decreased width mounted on said lower portion to form a space on each side of said upper portion, a roof structure, wings depending from said roof structure and fitting and guided in the space on each side of said upper portion, windows in said upper portion and wings, a bed structure mounted in the upper portion of said upper portion of the body, and means for lowering said wings to bring the windows of the wings and upper portion into alinement and to form a double window construction and to raise said wings to dispose its windows above the upper portion and bed structure and to provide a compartment above said upper portion and means for guiding said wing portion in its movement and retaining it in parallel relation with said lower portion, said means for raising and lowering the roof section and wings consisting of a pair of longitudinal shafts mounted in the upper portion of the body, fore and aft gear wheels on each of said shafts, fore and aft depending racks supported from the roof and engaging said gear wheels, sprocket wheels on one end of said shafts, a sprocket chain engaging said sprocket wheels to rotate said shafts, and a driving manually operated mechanism for rotating said sprocket wheels and driving said sprocket chain.

5. A vehicle body of the character described, comprising a lower part having a contiguous portion of increased width providing in said lower portion a pair of similar longitudinal chambers, an upper portion of decreased width mounted on said lower portion to form a space on each side of said upper portion, a roof structure, wings depending from said roof structure and fitting and guided in the space on each side of said upper portion, windows in said upper portion and wings, a bed structure mounted in the upper portion of said upper portion of the body, and means for lowering said wings to bring the windows of the wings and upper portion into alinement and to form a double window construction and to raise said wings to dispose its windows above the upper portion and bed structure and to provide a compartment above said upper portion and means for guiding said wing portion in its movement and retaining it in parallel relation with said lower portion, said guiding means consisting of a series of vertical rods mounted outside the upper portion and eyes or loops on the inner portion of the wings for engagement with said vertical rods.

6. A vehicle body of the character described, consisting of a floor, lower panels surmounting said floor, broad sills having their outer ends secured upon the upper ends of said panels, upper panels having their lower ends secured to the inner ends of said broad sills, narrow sills mounted on the upper ends of said upper panels, whereby a space is provided on each side of said upper panels and compartments provided on the inner side of said lower panels, windows in said upper panels, a roof structure, wings depending from said roof structure and fitting normally within the spaces at each side of said upper panels, windows in said wings normally alining with the windows of the upper panels, guide rods secured between the broad and narrow sills, loops carried by the wings and guided upon said rods, and means for raising and lowering the roof section and wings consisting of a pair of longitudinal shafts mounted in the upper portion of the body, fore and aft gear wheels on each of said shafts, fore and aft depending racks supported from the roof and engaging said gear wheels, sprocket wheels on one end of said shaft, a sprocket chain engaging said sprocket wheels to rotate said shafts, and a driving manually operated mechanism for rotating said sprocket wheels and driving said sprocket chain.

In testimony whereof I affix my signature.

ARTHUR S. THOMPSON.